United States Patent
Booth et al.

(10) Patent No.: US 9,065,685 B2
(45) Date of Patent: Jun. 23, 2015

(54) NETWORK SWITCH EMPLOYING A PROXY TO FACILITATE POWER SAVINGS IN A TELEPHONE NETWORK

(75) Inventors: Paul Norwood Booth, Los Gatos, CA (US); James Robert Molenda, Los Gatos, CA (US); Mohamed Kamel Zanaty, Cary, NC (US); John Knight Restrick, Jr., Montclair, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1195 days.

(21) Appl. No.: 12/371,450

(22) Filed: Feb. 13, 2009

(65) Prior Publication Data

US 2010/0208724 A1    Aug. 19, 2010

(51) Int. Cl.
*H04L 1/00* (2006.01)
*H04L 12/66* (2006.01)
*H04W 24/00* (2009.01)
*H04L 12/10* (2006.01)

(52) U.S. Cl.
CPC ............... *H04L 12/66* (2013.01); *H04L 12/10* (2013.01); *H04W 24/00* (2013.01)

(58) Field of Classification Search
CPC ........ H04L 12/66; H04L 12/10; H04W 24/00
See application file for complete search history.

(56) References Cited

U.S. PATENT DOCUMENTS

| | | | | |
|---|---|---|---|---|
| 7,921,307 | B2* | 4/2011 | Karam et al. | 713/300 |
| 7,991,870 | B1* | 8/2011 | Allred et al. | 709/223 |
| 8,300,666 | B2* | 10/2012 | Karam et al. | 370/496 |
| 2002/0166067 | A1* | 11/2002 | Pritchard et al. | 713/201 |
| 2004/0013099 | A1* | 1/2004 | O'Neill | 370/338 |
| 2006/0035590 | A1* | 2/2006 | Morris et al. | 455/41.2 |
| 2007/0133238 | A1* | 6/2007 | Herbold | 363/63 |
| 2007/0178857 | A1* | 8/2007 | Greene et al. | 455/127.1 |
| 2007/0284946 | A1* | 12/2007 | Robbins | 307/18 |
| 2008/0075048 | A1* | 3/2008 | Suszko | 370/338 |
| 2008/0137555 | A1* | 6/2008 | Mahesh et al. | 370/254 |
| 2009/0052362 | A1 | 2/2009 | Meier et al. | |
| 2009/0197565 | A1* | 8/2009 | Ogram et al. | 455/404.1 |
| 2009/0219846 | A1* | 9/2009 | Chan et al. | 370/311 |
| 2009/0235094 | A1* | 9/2009 | Diab et al. | 713/300 |
| 2010/0100750 | A1* | 4/2010 | Bobrek | 713/300 |
| 2010/0137698 | A1* | 6/2010 | Andrews et al. | 600/365 |
| 2010/0321169 | A1* | 12/2010 | Hussain et al. | 340/310.11 |
| 2011/0179302 | A1* | 7/2011 | Karam et al. | 713/340 |

* cited by examiner

*Primary Examiner* — Ayaz Sheikh
*Assistant Examiner* — Mounir Moutaouakil
(74) *Attorney, Agent, or Firm* — Patterson & Sheridan, LLP

(57) ABSTRACT

In an example embodiment, an IP phone is connected to a network switch that has an established communications channel to a call control server. The network switch acts as a proxy for the phone exchanging registration information that in effect keeps the phone registered while the phone itself can go to sleep as defined by periods of the day, periods where the phone is unused, or presence, which can then wake-up quickly with assistance from the switch. If the switch is not able to act as proxy, the phone can switch from sleep mode to "wake" up mode at predetermined intervals, such as every 30 seconds, in order to respond to keep alive packets from the call control server.

15 Claims, 4 Drawing Sheets

NETWORK SWITCH EMPLOYING A PROXY TO FACILITATE POWER SAVINGS IN A TELEPHONE NETWORK

TECHNICAL FIELD

The present disclosure relates generally to reducing power consumption

BACKGROUND

The IP ("Internet Protocol") telephone of today uses roughly the same level of power, whether the phone is in use or not. As currently designed, the actual action of talking on an IP phone does not require any additional power than when the IP phone is idle. Compare this to an analog phone, which only uses power when actually in use, and even then, the power used may be less than the power dissipated in a network able used to power an IP phone of today. An obvious solution would be to put the phone into some sort of sleep mode when not in use; however a problem with this solution is that the phone is required to maintain active communication through the network back to the call control server in order to stay registered.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
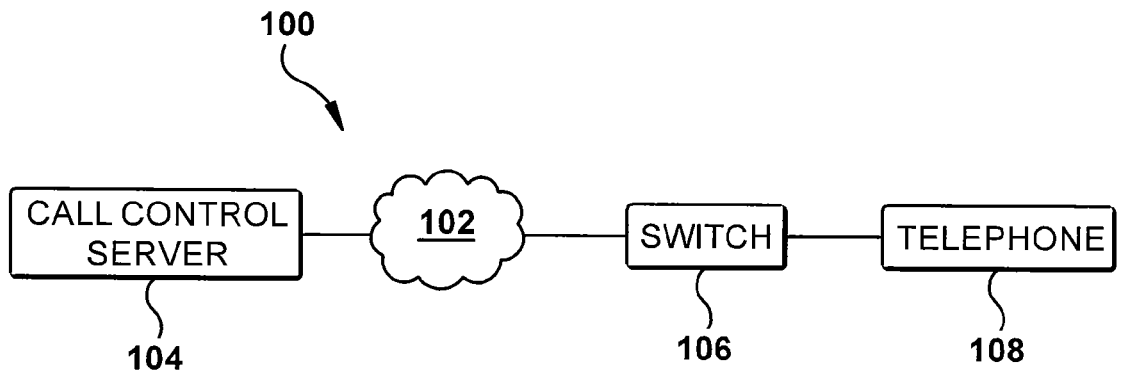
FIG. 1 illustrates an example of a network telephony system configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, for example a telephone configured to be operate via a network, comprising a network interface, a telephone circuit coupled to the network interface, power save logic coupled to the telephone circuit and the network interface, and a non-volatile memory coupled to the power save logic. The power save logic is configured to switch the telephone circuit from an active state to a power save state and is further configured to send a signal to a switch coupled to the network interface indicating the telephone circuit is switching to the power save state. The power save logic stores information in the non-volatile memory.

In accordance with an example embodiment, there is disclosed herein an apparatus, for example a network switch, comprising a network interface, a telephone interface; and logic coupled to the network interface and the telephone interface. The logic is configured to intercept and respond to packets for a telephone coupled to the telephone interface responsive to a signal received on the telephone interface that the telephone is switching to a power save state while the telephone is in the power save state.

In accordance with an example embodiment, there is disclosed herein a method comprising initiating a transition from an active state to a power save state by a telephone coupled to a network. A signal is sent to a switch coupled to the telephone indicating the telephone is transitioning to the power save state. Registration information is stored in a non-volatile memory and the telephone enters the power save state.

In accordance with an example embodiment, there is disclosed herein a method comprising receiving a signal by a network switch from a telephone coupled to a network via the switch that the telephone is entering a power save state. Keep alive packets are intercepted for the telephone while the telephone is in the power save state and responses to the keep alive packets are transmitted for the telephone while the telephone is in the power save state.

Description Of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The example embodiments disclosed herein are described in the context of an Internet Protocol ("IP") telephony system. Those skilled in the art, however, should readily appreciate that the principles and features of the example embodiments described herein can be applied to any type of voice communication system that employs a network, and thus the example embodiments herein should not be construed as limited to IP telephony systems.

In an example embodiment disclosed herein, an IP phone is connected to a network switch that has an established communications channel to a call control server. The network switch acts as a proxy for the phone exchanging registration information that in effect keeps the phone registered while the phone itself can go to sleep as defined by periods of the day, periods where the phone is unused, or presence, which can then wake-up quickly with assistance from the switch. If the switch is not able to act as proxy, the phone can switch from sleep mode to "wake" up mode at predetermined intervals, such as every 30 seconds, in order to respond to keep alive packets from the call control server. This prevents the phone from timing out and being forced to re-register.

In an example embodiment, there is disclosed a protocol, which may ride on top of a link layer discover protocol (LLDP), Cisco Discover Protocol (CDP), available from Cisco Systems, Inc,. 170 West Tasman Drive., San Jose, Calif. 95134, to exchange power state machine information, not just power classification levels. In an example embodiment, an Ethernet switch is configured to proxy keep-alive packets for the phone with the call control server and exchange call session information. In an example embodiment, a phone is configured to transition from a power save state to a powered up state upon receiving a signal from the switch, such as a wake-on-LAN ("local area network") packet and/or other stimuli such as detecting activity on a user interface, e.g. detecting a user is making a call. In an example embodiment, a telephone transitions from a power save state to a powered up (active) state at predefined intervals, such as every 30 seconds, to respond to keep-alive packets and to return to the power save state after responding to a keep-alive packet.

FIG. 1 illustrates an example of a network telephony system 100 configured in accordance with an example embodiment. A network 102, which may suitably comprise a local area network (LAN), Wide Area Network (WAN) or a combination of LANs and WANs is employed to enable telephone communications, such as Voice Over Internet Protocol ("VoIP") and/or IP telephony. Call control server 104 is coupled to network 102 and managers telephone communications with devices coupled to network 102. A switch 106 is coupled to the network and provides access to one or more devices to network 102. in the example illustrated in FIG. 1, a single telephone 108 is coupled via switch 106 to network 102; however, those skilled in the art should readily appreciate that a single telephone and switch are described merely for ease of illustration as any physically realizable number of switches and telephones may be coupled to network 102.

Call control server 104, switch 106 and telephone 108 comprise logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In accordance with an example embodiment, when telephone 108 decides to enter a power save mode, e.g. a mode with reduced power consumption from the normal operational (or active) mode, telephone 108 signals switch 106. Telephone 108 may decide to enter a power save mode depending on any predetermined criterion such as time of day (for example after work hours or during the evening), receiving data indicating a user associated with the telephone is traveling or not present, and/or telephone 108 has been idle for more than a predefined time period. Telephone 108 may signal switch 106 that it will be entering a power save state using a message compatible with existing protocols, such as a Link Layer Discover Protocol-Media Endpoint Discover (LLDP-MED) protocol or Cisco Discovery Protocol ("CDP"). In an example embodiment, telephone 108 changes its signature resistance to enter a sleep/power save mode.

In an example embodiment, switch 106 provides power to telephone 108 (for example telephone 108 may be configured for Power over Ethernet "PoE"). Switch 106 removes power from the telephone 108 responsive to the LLDP-MED/CDP message and/or to detecting a change in signature resistance of telephone 108. Telephone 108 stores registration information and its IP address in a non-volatile memory, enabling telephone 108 to retrieve the data when returning to an active state.

In an example embodiment, switch 106 acts as a proxy for telephone 108 and maintains keep alive packet exchanges with call control server 104 while telephone 108 is in power save mode. Thus, telephone 108 appears to be active to call control server 104 even though it is powered down.

In an example embodiment, telephone 108 wakes up due to user activity. For example, telephone 108 may detect the phone going off hook or buttons on a user interface being manipulated. In particular embodiments, where telephone 108 is receiving power from switch 106, e.g. PoE, telephone 108 suitably comprises hardware that converts a keypress or hookswitch change into a signature resistance indicating to switch 106 that telephone 108 is switching to an active mode whereupon switch 106 applies power to telephone 108. Once telephone 108 is active, communication with call control server 104 and telephone 108 is re-established. Because switch 106 was acting as a proxy for telephone 108 while telephone 108 was in power save mode and telephone 108 stored its registration information and its IP address, telephone 108 does not have to re-register with call control server 104.

In an example embodiment, when call control server 104 receives an incoming call for telephone 108, the call is routed to switch 106. Because switch 106 is acting as a proxy for telephone 108, switch 106 receives and exchanges messages for the incoming call. Switch 106 then signals telephone 108 to exit the power save mode and return to active mode. For example, for a telephone that is Wake-on LAN (WOL) enabled, switch 106 may send a 'magic' (or comparable) packet as defined by the Institute of Electrical and Electronics Engineers (IEEE) 802.3 standard. Because telephone 108 has stored its registration information, telephone 108 is able to quickly power up and receive the call from call control server 102.

In an example embodiment, during power save mode packets exchanged between switch 106 and telephone 108 are at a lowest possible data rate. For example the packets may be sent at the lowest possible Ethernet rate. This can be beneficial because lower data rates consume less power.

Figure 2:
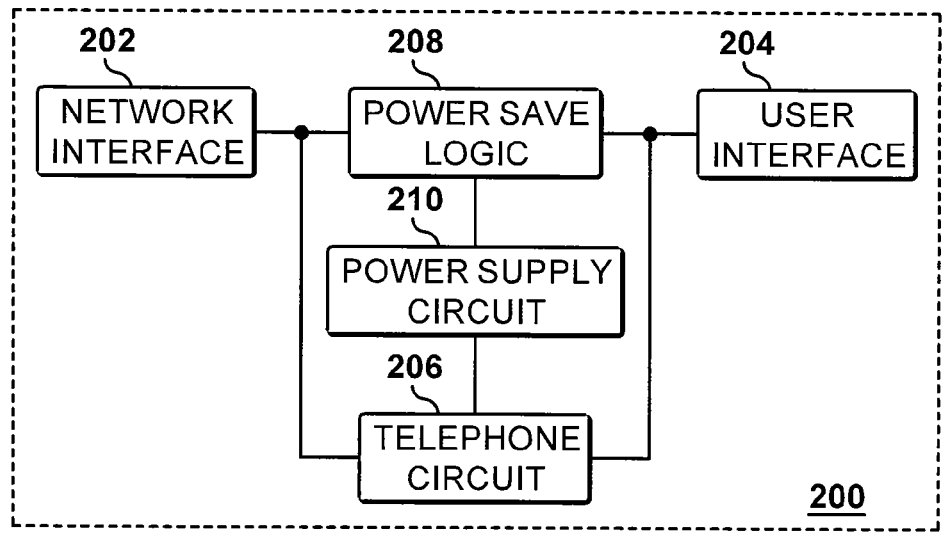
FIG. 2 is a block diagram illustrating an example of a network telephone in accordance with an example embodiment.

FIG. 2 is a block diagram illustrating an example of a network telephone 200 in accordance with an example embodiment. Telephone 200 is suitable to implement the functionality of telephone 108 described in FIG. 1. The network telephone comprises a network interface 202 that is suitable for coupling telephone 200 to a network such as a LAN or WAN. User interface 204 allows a user of telephone 200 to input and receive data. For example, user interface 204 may include a hookswitch so the user can indicate when the phone will be off hook, for example while making a telephone call. User interface 204 may also include a keypad to enable a user to enter data, for example a telephone number to call and/or textual data. User interface may also include a display and audio output to provide data to a user. Telephone circuit 206 coupled between network interface 202 and user interface 204 comprises circuits and/or logic for providing network telephony. For example, telephone circuit 206 may suitably comprise circuits for converting audio signals received at user interface 204 into packets for transmission on network interface 202 and/or converting packets received at network interface 202 to voice or text signals.

Power save logic 208 is coupled to network interface 202 and user interface 204. Power save logic 208 can determine when the phone should transition from the active mode to the power save state and/or transition from a power save state to an active state. Power save logic 208 also comprises a memory (not shown, see e.g. FIG. 4) for storing registration information and/or other data such as an IP address for telephone 200. In particular embodiments the memory is a non-volatile memory.

Power supply circuit provides power to telephone circuit 206. Power supply circuit 210 may receive power from an internal power source such as a battery, or may receive power from an external source such as PoE via network interface 202. Power supply circuit 210 is responsive to power save logic 208 to switch telephone circuit 206 and/or user interface 206 to a lower power consumption state responsive to a signal from power save logic 208. For example, power supply circuit 210 may switch off, or to a lower power consumption mode, responsive to power supply logic 208 signaling power supply circuit 210 to enter a power save mode. Power supply circuit 210 may also be configured to be responsive to switch to an active (or full power) state responsive to a signal from power supply logic 208. Power supply circuit 210 may not be present in embodiments receiving power from external power sources, such as PoE.

In an example embedment, when power save logic 208 decides to switch telephone 200 into a power save mode, power save logic 208 sends a signal via network interface 202 to a switch or other device on network coupled to network interface 202 notifying the switch or other device that telephone 200 is entering a power save state. Power save logic 208 stores registration and/or other data such as an IP address for telephone 200 into a memory. In particular embodiments, power save logic 208 is configured to change a signature resistance at network interface 202 responsive to switching telephone circuit 206 from the active state to the power save state.

In an example embodiment, user interface 204 is coupled to telephone circuit 206 and power save logic 208. Power save logic 208 is configured to detect activity at user interface 204, such as key presses and/or switching a hookswitch off-hook. Power save logic 208 is further configured to switch the telephone circuit 206 from the power save state to the active state upon detecting activity at the user interface.

In an example embodiment, power save logic 208 is further configured to switch telephone circuit 206 from a power save state to an active state responsive to receiving a signal on network interface 202 indicating an incoming call for the telephone circuit. For example, a WOL packet may be received on network interface 202. Power save logic 208 switches on telephone circuit 206 (and/or power supply circuit 210) responsive to the WOL packet.

In an example embodiment, where a switch or other device is not acting as a proxy for telephone 200, power save logic 208 wakes up telephone 200 at predetermined intervals to respond to keep alive packets and maintain registration with the call control server. For example, while telephone 200 is in power save mode, power save logic 208 switches telephone 200 to active mode after a predetermined time period. Telephone 200 can remain in power save mode until a keep alive packet is received on network interface 202. Telephone circuit 206, which comprises logic for responding to the keep alive packet, sends a signal via network interface 202 in response to the keep alive packet. After a response is sent, power save logic 208 switches telephone 200 to a power save state.

Figure 3:
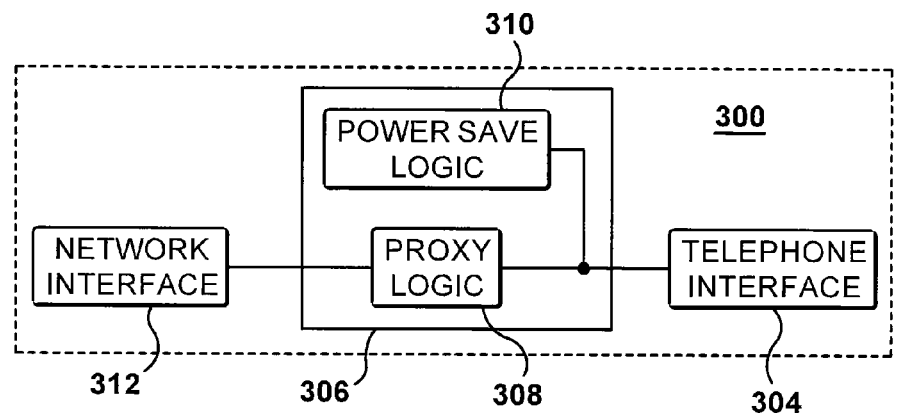
FIG. 3 is a block diagram illustrating an example of a network switch in accordance with an example embodiment.

FIG. 3 is a block diagram illustrating an example of a network switch 300 configured in accordance with an example embodiment. Switch 300 is suitable for implementing the functionality of switch 204 described in FIG. 1.

Switch 300 comprises a network interface 302, a telephone interface 304 and logic coupled to network interface 302 and telephone interface 304. Network interface 304 is suitably any interface capable of being coupled to a network, such as an Ethernet port. Telephone interface 304 is suitably an interface capable of communicating with a network telephone, such as telephone 108 in FIG. 1.

In an example embodiment, logic 306 is configured to intercept and respond to packets for a telephone coupled to the telephone interface 304 responsive to a signal received on the telephone interface 304 that the telephone is switching to a power save state while the telephone is in the power save state. In an example embodiment, Proxy logic 308 can receive and respond to packets received on network interface 302 for a telephone coupled to telephone interface 304 while the telephone is in the power save state. This enables the telephone to maintain registration with a call control server while the telephone is in the power save mode.

In particular embodiments, such as in embodiments where switch 300 provides power to a telephone coupled to telephone interface 304, switch 300 may further comprise power save logic 310. Power save logic can be configured to provide power via telephone interface 304 when a telephone is in active mode and cease providing power while the telephone is in power save mode. For example, power save logic 310 can be responsive to CDP/LLDP signals and/or changes in resistance detected at telephone interface 304 to switch off power to a telephone coupled to telephone interface 304.

In an example embodiment, logic 306 is further configured to signal the telephone coupled to telephone interface 304 to switch to an active state responsive to detecting an incoming call. For example, if an incoming call is received on network interface 302, logic 306 can signal the telephone coupled to telephone interface 304 to switch to an active state to receive the call. In addition, logic 306 may also be configured to respond to the incoming call (e.g. respond to signaling packets) until the telephone returns to the active state.

In an example embodiment, logic 306 is configured to detect when a telephone coupled to telephone interface 304 is switching from a power save mode to an active mode. For example logic 306 can detect a change in signature resistance at telephone interface 304. As another example, logic 306 may detect a signal on telephone interface 304. In embodiments where power is being supplied by switch 300, power is restored to the telephone.

Figure 4:
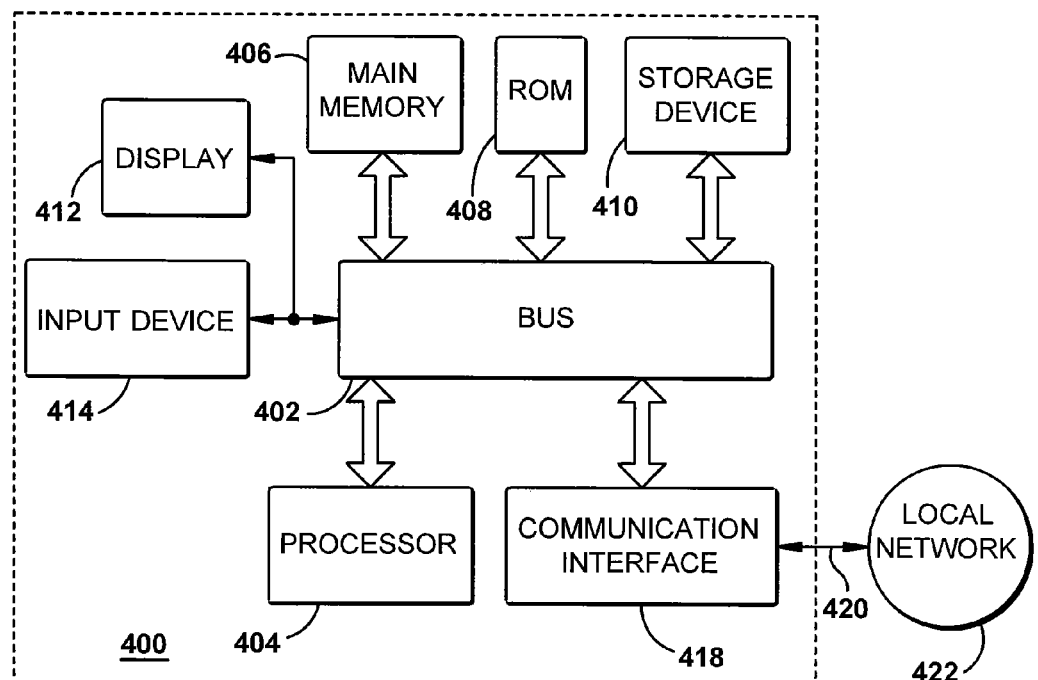
FIG. 4 illustrates an example of a computer system upon which a network telephone can be implemented in accordance with an example embodiment.

FIG. 4 illustrates an example of a computer system 400 upon which a network telephone can be implemented in accordance with an example embodiment. For example, computer system 400 can be employed to implement telephone 108 (FIG. 1) and/or telephone 200 (FIG. 2).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 such as a liquid crystal display (LCD), for displaying information to a user. An input device 414, such as a keyboard including alphanumeric and other keys is coupled to bus 402 for communicating information and command selections to processor 404.

An aspect of the example embodiment is related to the use of computer system 400 for implementing power savings on an IP Telephone. According to an example embodiment, implementing power savings on an IP telephone is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 400 also includes a communication interface 418 coupled to bus 402. Communication interface 418 provides a two-way data communication coupling computer system 400 to a network link 420 that is connected to a local network 422. For example, computer system 400 can send and receive data packets, such as IP telephone packets on network 422. In addition, computer system may receive packets, such as WOL packets, to command computer system 400 to switch to an active mode.

Figure 5:
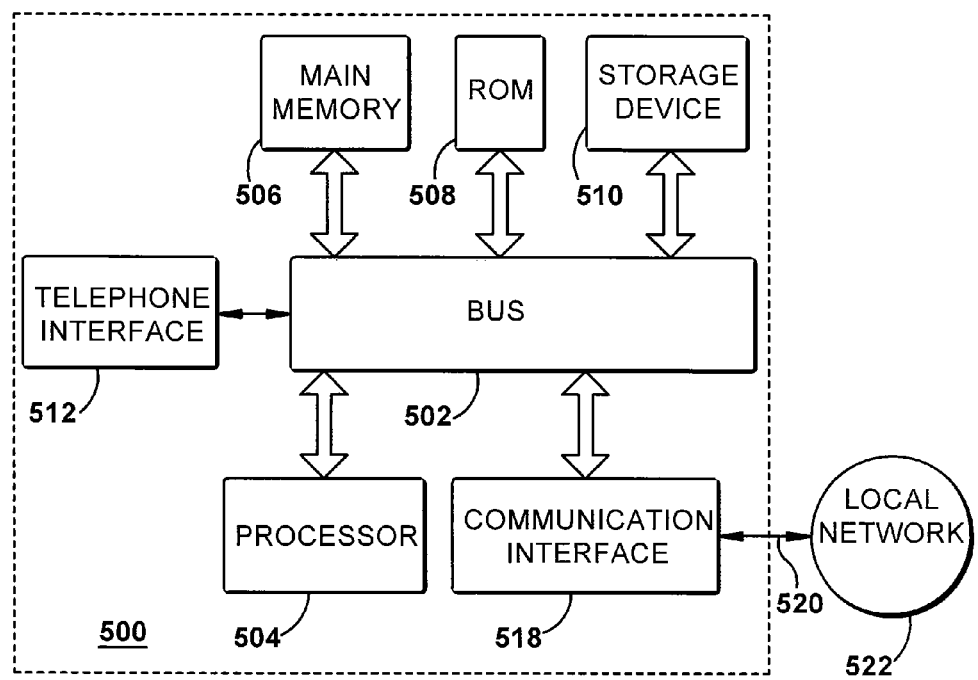
FIG. 5 illustrates an example of a computer system upon which a network switch can be implemented in accordance with an example embodiment.

FIG. 5 illustrates an example of a computer system 500 upon which a network switch can be implemented in accordance with an example embodiment. Computer system 500 is suitable for implementing network switch 106 (FIG. 1) and/or switch 300 (FIG. 3).

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Telephone interface 512 enables computer system 500 to communicate with a network telephone device, such as a VoIP configured telephone. For example, computer system 500 can receive signals from a telephone (not shown) coupled to telephone interface 512 to determine when the telephone is transitioning between power save and active states. In addition, computer system 500 can send signals to the telephone via telephone interface 512. For example, if the telephone is in the power save state, computer system 500 can command the telephone to wakeup and switch to the active state.

An aspect of the example embodiment is related to the use of computer system 500 for implementing power savings on an IP telephone. According to an example embodiment, implementing power savings on an IP telephone is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

Computer system 500 also includes a communication interface 518 coupled to bus 502. Communication interface 518 provides a two-way data communication coupling computer system 500 to a network link 520 that is connected to a local network 522. This allows computer system 500 to route telephone packets from network 522 to a telephone coupled on telephone interface 512. In accordance with an example embodiment, computer system 500 acts as a proxy and responds to packets received on communication interface 518 while a telephone coupled to telephone interface 512 is in a power save state.

Figures 6, 7:
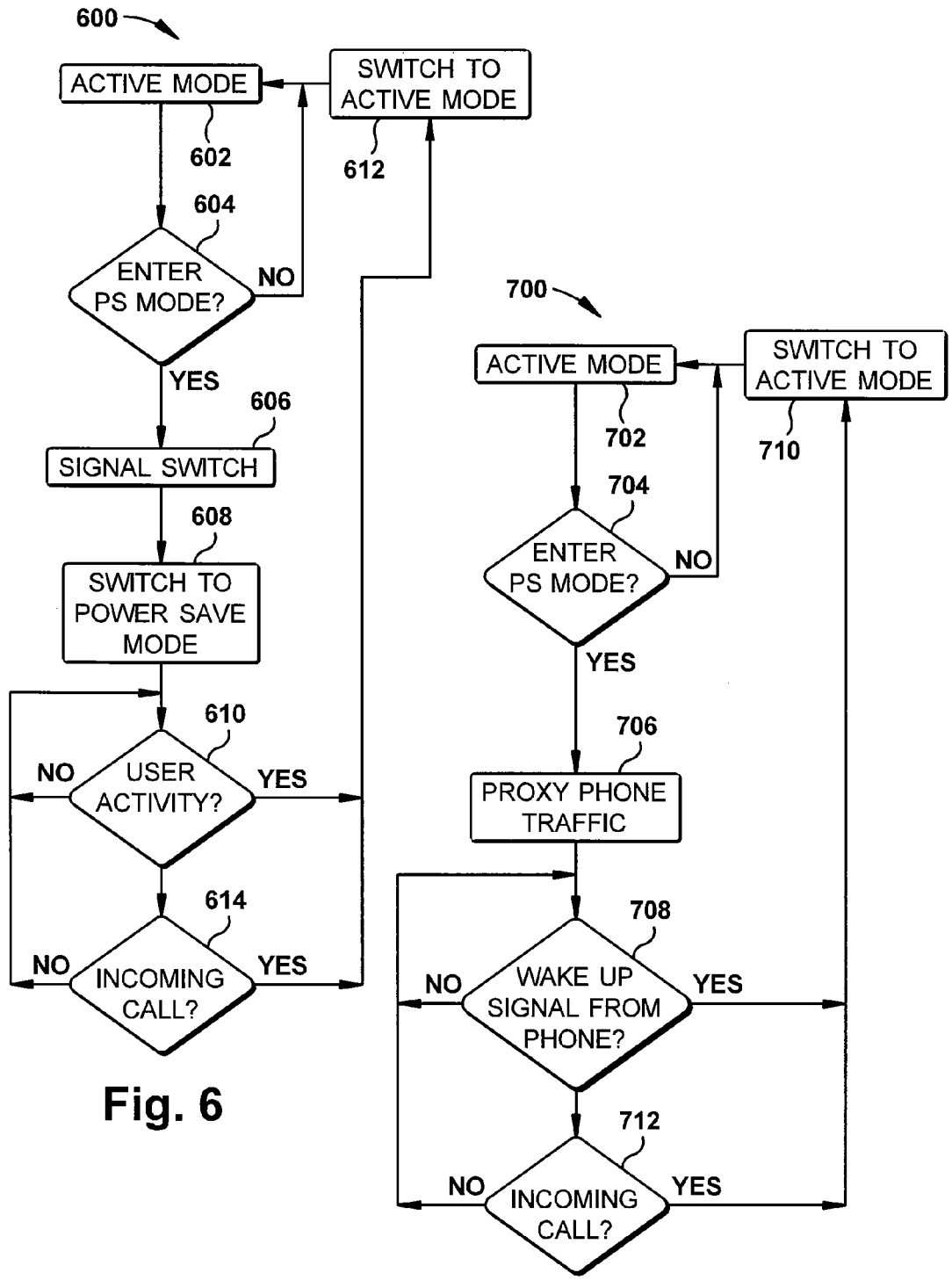
FIG. 6 is a block diagram of a methodology for a telephone coupled to a network to implement power savings.
FIG. 7 is a block diagram of a methodology implement power savings by a network switch coupled to a network and a network telephone.

In view of the foregoing structural and functional features described above, methodologies in accordance with example embodiments will be better appreciated with reference to FIGS. 6 and 7. While, for purposes of simplicity of explanation, the methodologies of FIGS. 6 and 7 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof.

FIG. 6 is a block diagram of a methodology 600 for a telephone coupled to a network to implement power savings. The telephone may provide its own power, e.g. via a battery or other electrical connection, and/or receive power from an external device such as a network switch. Methodology 600 is suitably adaptable to either configuration.

At 602, the telephone is operating in an active mode. While in active mode, the telephone is able to receive calls and respond to keep alive packets.

At 604, the telephone determines whether to enter a power save mode. The decision to enter power save mode may be based on any criterion such as time of day, data indicating a user for the telephone is not present, or the telephone is idle for more than a predefined time period. If, at 604, the telephone is remaining in active mode (NO), operation resumes at 602.

If, at 604, the telephone is entering a power save mode (YES) at 606 a switch or other device coupling the telephone to the network is signaled that the telephone will be transitioning to power save mode. A signaling protocol, such as CDP or LLDP can be employed to signal the switch, or the switch may be signaled by other means such as by changing a signature resistance.

At 608, the telephone switches to power save mode. Registration information may be stored in a non-volatile memory. In an example embodiment, other data such as the telephone's IP address are also stored in non-volatile memory.

At 610, a determination is made whether user activity has been detected. For example user activity may be detected if the phone is switched off-hook or key presses are detected by a user input device such as a keypad. If user activity has not been detected (NO), the telephone remains in the power save state. If user activity has been detected (YES), at 612 the telephone switched to active mode. The telephone may signal a switch or other device coupling the telephone to a network that the telephone is transitioning to active mode by sending a signal via a pre-arranged protocol or by changing a signature resistance.

At 612, a determination is made whether an incoming call has been detected. For example, the telephone may receive a signal, such as a WOL packet, on its network interface indicating an incoming call has been received. If no incoming call is detected (NO), the telephone remains in a power save state. If an incoming call is detected (YES), at 612, the telephone switches to active mode.

In an example embodiment, where no other device is acting as a proxy for the telephone while in power save mode, the telephone may periodically switch to active mode to receive and respond to keep alive packets from a call control server. After the response is sent, the telephone can return to the power save state.

FIG. 7 is a block diagram of a methodology 700 implement power savings by a network switch coupled to a network and a network telephone. For example, methodology 700 can be employed by switch 104 (FIG. 1).

At 702, a telephone coupled to the switch is in active mode. While in active mode, the switch forwards packets to and from the telephone.

At 704, the switch determines whether the telephone is entering a power save mode. For example, the switch can determine the telephone is entering a power save mode based on a signal received from the telephone or by detecting a change in the telephone's signature resistance. If the telephone is remaining in active mode (NO) active mode operations continue at 702.

If, at 704, the switch determines the telephone is entering a power save mode (YES), at 706 the switch begins to proxy telephone traffic for the telephone. The switch can intercept and respond to packets directed to the phone while performing the proxy function. For example, keep alive packets for the telephone can be intercepted by the switch, which will respond for the telephone, enabling the telephone to remain registered with a call control server. The switch provides proxy service for the phone until the telephone indicates it is transitioning to an active state (for example in response to user activity at 708) and/or an incoming call is received for the telephone as illustrated at 712.

If the switch receives a wakeup signal from the phone, as illustrated at 708 (YES), at 710 the phone is switched to active mode and the switch discontinues providing the proxy service, and forwards all packets for the telephone to the telephone. The signal may be received via a pre-established protocol between the phone and the switch, or the switch may detect the telephone is switching to an active state via other means such as detecting a change in the telephone's signature resistance. If no user activity is detected at 708 (NO) the switch continues providing proxy service for the phone.

If an incoming call is detected, as illustrated at 712 (YES), the switch signals the telephone to switch to an active mode. For example, the switch may provide a signal to the telephone (if the phone is in a low power mode it may be able to receive packets at a low or minimal data rate, e.g. the minimum Ethernet packet rate). In an example embodiment the switch sends a WOL packet to the phone. The switch may continue to provide proxy service for the phone until the phone switched to active mode at 710. For example, the switch may respond to signaling for the call until the phone is able to respond. If no incoming call is being received at 712 (NO) the switch continues to provide proxy service for the telephone.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a network interface having a signature resistance;
a telephone circuit coupled with the network interface;
power save logic coupled with the telephone circuit and with the network interface; and
a non-volatile memory coupled with the power save logic;
wherein the power save logic is configured to switch the telephone circuit between an active state and a power save state;
wherein the power save logic is further configured to selectively send a signal to an associated network switch coupled with the network interface indicating the telephone circuit is switching to the power save state and to store registration information in the non-volatile memory;
wherein the power save logic is configured to selectively change the signature resistance of the network interface to indicate to the associated network switch coupled with the network interface that the apparatus is switching from the active state to the power save state; and
wherein the power save logic is configured to selectively directly maintain an active network connection with an associated call control service for the apparatus when the apparatus is in the power save state and in an absence of the associated network switch acting as a proxy for maintaining the active network connection on behalf of the power save logic.

2. The apparatus as set forth in claim 1, wherein the power save logic is further configured to store an Internet Protocol ("IP") address in the non-volatile memory.

3. The apparatus as set forth in claim 1, further comprising a user interface coupled to the telephone circuit and the power save logic, wherein the power save logic is further configured to switch the telephone circuit from the power save state to the active state upon detecting activity at the user interface.

4. The apparatus as set forth in claim 1, wherein the power save logic is further configured to switch the telephone circuit from the power save state to the active state responsive to receiving a signal on the network interface indicating an incoming call for the telephone circuit.

5. The apparatus as set forth in claim 1, wherein the power save logic is configured to switch the telephone circuit from the active state to the power save state responsive to one of a group consisting of determining a current time is within a predefined time period, and determining the telephone circuit has been idle for more than a predetermined time.

6. The apparatus set forth in claim 1, wherein the power save logic is operable to communicate via the network interface at a lower data rate while in power save state than while in the active state.

7. The apparatus set forth in claim 1, wherein:
the power save logic is operable to selectively directly maintain the active network connection when the apparatus is in the power save state and in the absence of the associated network switch acting as the proxy for maintaining the active network connection on behalf of the power save logic by periodically transitioning the apparatus between the active state where the network interface actively communicates with the associated call control service, and the power save state suspending the communicating.

8. A method, comprising:
initiating, by a telephone coupled with an associated network, a transition from an active state to a power save state;
sending a signal to an associated switch coupled with the telephone, the signal indicating the telephone is transitioning to the power save state;
storing registration information in a non-volatile memory;
changing a signature resistance at a network interface to indicate the transition to the power save state;
entering the power save state;
initiating an active keep-alive session between the associated switch and an associated call control center while the telephone is in the power save state; and
selectively directly maintaining, by the telephone, the keep-alive session in an absence of the associated switch acting as a proxy for maintaining the active keep-alive session on behalf of the telephone.

9. The method according to claim 8, wherein the storing further comprises storing an Internet Protocol ("IP") address for the telephone in the non-volatile memory.

10. The method according to claim 8, further comprising initiating a transition from the power save state to the active state responsive to detecting activity at a user interface.

11. The method according to claim 8, further comprising initiating a transition from the power save state to the active state responsive to detecting a signal indicating an incoming phone call.

12. The method according to claim 8, further comprising:
initiating a transition from the power save state to the active state after a predetermined time period;
responding to a keep alive packet; and
returning to the power save state.

13. The method according to claim 8, wherein initiating the transition is responsive to determining a current time is within a predefined time period.

14. The method according to claim 8, wherein initiating the transition is responsive to detecting the telephone has been idle for greater than a predefined time period.

15. The method according to claim 8, wherein initiating the transition is responsive to receiving data indicating a user for the telephone is not present.

* * * * *